US012606140B2

(12) United States Patent
Belling-Hoffmann et al.

(10) Patent No.: US 12,606,140 B2
(45) Date of Patent: Apr. 21, 2026

(54) VALVE DEVICE FOR A SYSTEM FOR A VEHICLE AND SYSTEM FOR A VEHICLE

(71) Applicant: Knorr-Bremse Systeme Fuer Nutzfahrzeuge GmbH, Munich (DE)

(72) Inventors: Michael Belling-Hoffmann, Renningen (DE); Alexander Matt, Bruchsal (DE); Christian Kaufmann, Sindelfingen (DE); Dominikus Drayss, Wallduern (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 843 days.

(21) Appl. No.: 18/049,370

(22) Filed: Oct. 25, 2022

(65) Prior Publication Data

US 2023/0128573 A1 Apr. 27, 2023

(30) Foreign Application Priority Data

Oct. 27, 2021 (DE) ..................... 10 2021 127 909.7

(51) Int. Cl.
| | |
|---|---|
| *B60T 13/68* | (2006.01) |
| *B60W 50/023* | (2012.01) |
| *F16K 31/02* | (2006.01) |
| *H02H 3/08* | (2006.01) |

(52) U.S. Cl.
CPC ........... *B60T 13/68* (2013.01); *B60W 50/023* (2013.01); *F16K 31/02* (2013.01)

(58) Field of Classification Search
CPC .............. B60T 13/68; B60T 2270/402; B60T 2270/413; B60W 50/023; F16K 31/02
See application file for complete search history.

(56) References Cited

U.S. PATENT DOCUMENTS

| | | | | |
|---|---|---|---|---|
| 11,787,427 B2 * | 10/2023 | Belling | ............... | B60W 50/023 701/29.2 |
| 11,791,618 B2 * | 10/2023 | Belling | ............... | B60R 16/0232 324/511 |
| 12,275,382 B2 * | 4/2025 | Belling-Hoffmann | ... | H02H 3/08 |
| 12,420,812 B2 * | 9/2025 | Ushiro | .................... | G05B 9/03 |
| 12,434,677 B2 * | 10/2025 | Hayes | .................. | B60T 13/683 |
| 2020/0406879 A1 | 12/2020 | Hecker et al. | | |

(Continued)

*Primary Examiner* — Thomas W Irvin
(74) *Attorney, Agent, or Firm* — NORTON ROSE FULBRIGHT US LLP

(57) ABSTRACT

A valve device or a vehicle system, the system including first and second control units which are electrically connectable or connected to the valve device, which includes a valve unit with at least one actuator for actuating the valve unit, first/second supply ports for the electrical connection of the actuator to the first/second control units, first/second main ports for the electrical connection of the actuator to the first/second control units, first/second electric protective circuits, and a valve housing for accommodating the valve unit and the protective circuits. The first protective circuit is electrically connected between the first/second supply ports, and the actuator. The second protective circuit is electrically connected between the actuator and the first/second main ports. Each protective circuit includes an electrical fuse device and a diode element that are integrated in series in at least the first/second supply ports or at least the first/second main ports.

14 Claims, 2 Drawing Sheets

(56) References Cited

U.S. PATENT DOCUMENTS

| | | | | |
|---|---|---|---|---|
| 2021/0269048 A1* | 9/2021 | Herges | .................. | B60T 17/221 |
| 2021/0347347 A1* | 11/2021 | Cho | ........................ | B60T 13/74 |
| 2022/0161809 A1* | 5/2022 | Belling | .............. | B60R 16/0231 |
| 2022/0209524 A1* | 6/2022 | Belling | .................... | H02H 3/05 |
| 2023/0132284 A1* | 4/2023 | Belling-Hoffmann | ....................... | |
| | | | | B60T 17/00 |
| | | | | 251/129.01 |

* cited by examiner

VALVE DEVICE FOR A SYSTEM FOR A VEHICLE AND SYSTEM FOR A VEHICLE

RELATED APPLICATION INFORMATION

The present application claims priority to and the benefit of German patent application no. 10 2021 127 909.7, which was filed in Germany on Oct. 27, 2021, the disclosure of which is incorporated herein by reference.

FIELD OF THE INVENTION

The present invention relates to a valve device for a system for a vehicle and to a system for a vehicle, in particular an electronic braking system.

BACKGROUND INFORMATION

During automated or autonomous driving of vehicles of all types, redundancies, for example, have to be created. Said redundancies have to be configured in particular in such a manner that the vehicle cannot pass into a critical safety state or an uncontrollable state. For example, there has been a move to placing systems, for example the electrical braking system EBS or ABS, at multiple points in the vehicle. Another option may consist in supplementing the system with similar subsystems which can reproduce the functionality. In the event of error the defective system can be switched off and the second error-free system can take on the task and thus produce the redundancy. In order, for example, to be able to produce an electrical braking system in utility vehicles redundantly, in particular a number of pressure control valves on each axle or on a respective wheel would therefore be doubled.

SUMMARY OF THE INVENTION

Against this background, it is an object of the present invention to provide an improved valve device for a system for a vehicle and an improved system for a vehicle.

This object may be achieved by a valve device for a system for a vehicle and by a system for a vehicle in accordance with the main claims.

According to embodiments, in particular a protected pressure control valve for dual use or multiple use can be provided for a vehicle system, for example vehicle braking system, to be configured redundantly. In this connection, electric protective circuits that each comprise an electrical fuse device and a diode element can be integrated in the pressure control valve. For example, in a system for a vehicle, in particular a pressure control valve can therefore be used by two control units, in a manner electrically protected by the fuse devices, in order to produce redundancy in the system.

Advantageously, according to embodiments, in particular a cost-effective multiple system can be provided, with it being possible to avoid doubling pressure control valves. It is therefore possible not only to save costs but also construction space and an outlay on wiring, and therefore such a valve device for a system can be integrated in a simple manner in the vehicle. An integration of the protective circuits, each one of which is configured, for example, as a combination of fuse and diode, in a valve, in particular a pressure control valve, has the advantage that vehicle wiring for the dual use is facilitated. For example, Y cables, which may be susceptible to corrosion, can be dispensed with. It is possible to adapt the pressure control valve via suitable plug-in connections. For example, it is also possible to realize two 3-pin connections on a pressure control valve instead of one 3-pin connection.

A valve device for a system for a vehicle, wherein the system has a first control unit and a second control unit, wherein the control units are electrically connectable or connected to the valve device, has the following features:

a valve unit for setting a pressure of a working medium for the system, wherein the valve unit has at least one actuator for actuating the valve unit;

a first supply port for the electrical connection of the actuator to the first control unit, a second supply port for the electrical connection of the actuator to the second control unit, a first main port for the electrical connection of the actuator to the first control unit and a second main port for the electrical connection of the actuator to the second control unit;

a first electric protective circuit and a second electric protective circuit, wherein the first protective circuit is electrically connected between the first supply port and the second supply port, on the one hand, and the actuator, on the other hand, wherein the second protective circuit is electrically connected between the actuator, on the one hand, and the first main port and the second main port, on the other hand, wherein each protective circuit has an electrical fuse device and a diode element that are integrated in series in at least the first and/or second supply port or at least the first and/or second main port; and a valve housing for accommodating the valve unit and the protective circuits.

The vehicle can be a motor vehicle, in particular a utility vehicle, for example a truck or the like. The system can be configured, for example, as an electronic braking system or electro-pneumatic braking system or other braking system or other vehicle system. The first control unit can be a primary control unit, with the second control unit being able to be a redundant control unit. The first control unit can be assigned to a first function or assistance function of the vehicle or of the system, with the second control unit being able to be assigned to a second function or assistance function of the vehicle or of the system. The device can be configured as a pressure control valve. The valve unit and therefore the valve device can have at least one solenoid valve. The actuator can comprise resistive inductance. The diode element can have a diode, a semiconductor diode or the like. The fuse device can have a safety fuse or another electrical fuse.

According to one embodiment, the actuator can be attachable to a first electric supply potential of the first control unit via the first supply port. The actuator can be attachable here to a second electric supply potential of the second control unit via the second supply port. As an alternative or in addition, it is also possible, however, for the actuator to be attachable to an electric supply potential of the first control unit via the first supply port, with the actuator being attachable to the electric supply potential of the second control unit via the second supply port, with the actuator being attachable to a first electric ground potential of the control units via a first main port and to a second electric ground potential of the control units via the second main port. The actuator can be attachable here to a common electric ground potential of the control units via the first main port and the second main port. Such an embodiment affords the advantage that, despite the use of a common ground potential for the at least one actuator, a redundant activation of the valve device can be realized in a manner protected against errors, such as, for example, short circuits and the like.

The diode element of the first protective circuit can also be connected between the first supply port and the actuator. The fuse device of the first protective circuit can be connected here between the second supply port and the actuator. The fuse device of the second protective circuit can be connected here between the actuator and the first main port. Furthermore, the diode element of the second protective circuit can be connected between the actuator and the second main port. Such an embodiment affords the advantage of it being possible, with a multiple use of the valve device, for reliable protection against error situations to be achieved.

In particular, a forward direction of the diode element of the first protective circuit can run from the first supply port to the actuator. A forward direction of the diode element of the second protective circuit can run here from the actuator to the second main port. Such an embodiment affords the advantage that a redundant operation of the valve device is made possible by two control units in a safe and error-protected manner.

In addition, the valve unit can have at least one further actuator for actuating the valve unit. Here, the valve device can have at least one third supply port for the electrical connection of the further actuator to the first control unit, at least one fourth supply port for the electrical connection of the further actuator to the second control unit and at least one further protective circuit. The further protective circuit can be electrically connected here between the third supply port and the fourth supply port, on the one hand, and the further actuator, on the other hand. The second protective circuit can be electrically connected between the further actuator, on the one hand, and the first main port and the second main port, on the other hand. The actuator of the valve unit can be, for example, part of an inlet valve of the valve device, wherein the further actuator can be, for example, part of an outlet valve of the valve device. Such an embodiment affords the advantage of it being possible to protect any desired number of actuators of the valve device with minimal outlay.

The diode element of the further protective circuit can be connected here between the third supply port and the further actuator. The fuse device of the further protective circuit can be connected between the fourth supply port and the further actuator. In particular, a forward direction of the diode element of the further protective circuit can also run from the third supply port to the further actuator. Such an embodiment affords the advantage that reliable protection against error situations can be realized for a robust redundant operation of a valve device with a plurality of actuators.

Furthermore, the further actuator can be attachable here to the first electric supply potential via the third supply port. The further actuator can be attachable to the second electric supply potential via the fourth supply port. Such an embodiment affords the advantage that the further actuator can also be incorporated with minimal outlay in the fuse protection and therefore protected.

The fuse devices of the protective circuits can also be arranged exchangeably in the protective circuits. Such an embodiment affords the advantage that, after an error situation has occurred, it is possible to simply and cost-effectively exchange one fuse device or a plurality of fuse devices to restore the functioning capability of the protective circuits.

A system for a vehicle comprises the following features: an embodiment of the abovementioned valve device; and the first control unit and the second control unit, wherein the control units are electrically connectable or connected to the valve device.

The valve device can be connectable or connected to the first control unit and to the second control unit by electric lines. The system can also have at least one further valve device.

It is also possible for the valve device to have a first group of mechanically combined electric ports for attaching the first control unit and a second group of mechanically combined electric ports for attaching the second control unit. One plug goes to the first control unit, the other to the second control unit. One plug coming loose does not lead to a failure of the functionality of the system.

Exemplary embodiments of the approach presented here will be explained in more detail in the description below with reference to the figures.

DETAILED DESCRIPTION

Figure 1:
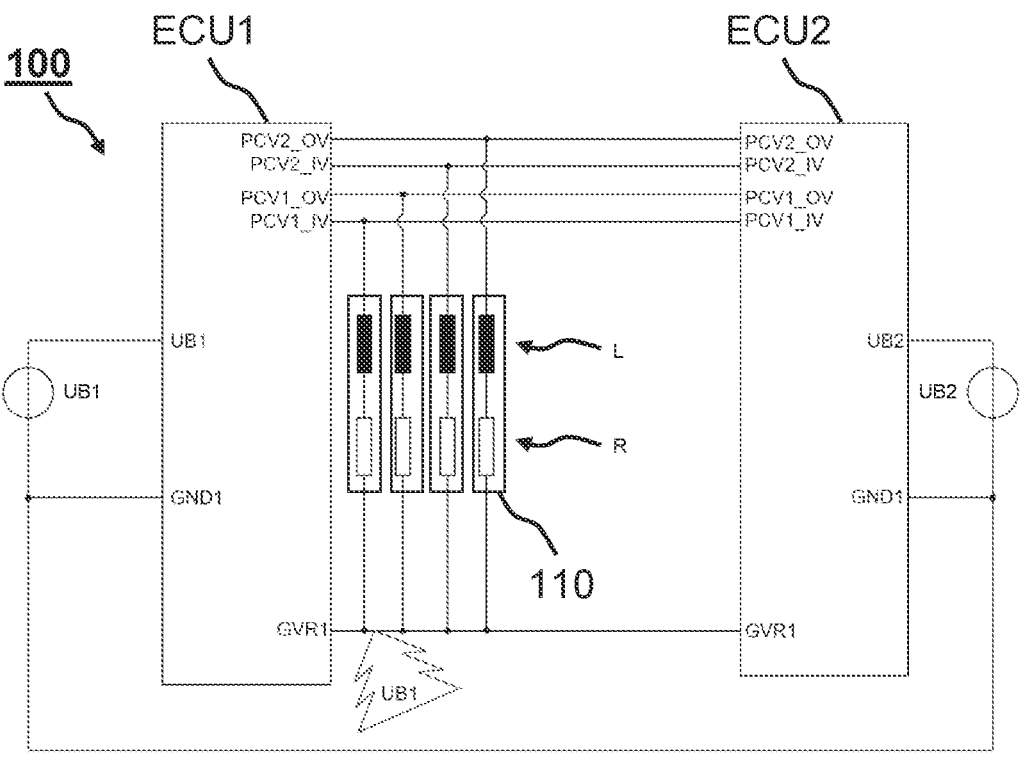
FIG. 1 shows a schematic illustration of a system.

FIG. 1 shows a schematic illustration of a system 100. Of the system 100, here in particular a first control unit or a primary control unit ECU1, a second control unit or redundant control unit ECU2 and a plurality of actuators 110 of pressure control valves (PCV) are shown. The system is, for example, a braking system. A plurality of electronic control units, here the first control unit ECU1 and the second control unit ECU2, for braking control use common pressure control valves with the actuators 110 in order to produce redundancy in the system 100.

By way of example, two pressure control valves each having two actuators 110 are shown here. In the schematic illustration of FIG. 1, each of the actuators 110 is shown as an equivalent circuit diagram of an inductance L and a resistance R. The first control unit ECU1 comprises ports PCV1_IV, PCV1_OV, PCV2_IV, PCV2_OV and GVR1 for the electrical attachment to the actuators 110, and ports UB1 and GND1 for the attachment to a first electrical voltage source. The second control unit ECU2 comprises ports PCV1_IV, PCV1_OV, PCV2_IV, PCV2_OV and GVR1 for the electrical attachment to the actuators 110, and ports UB2 and GND1 for the attachment to a second electrical voltage source.

Furthermore, a short circuit of UB1 to the jointly used actuator ground is shown by way of example. In some error situations, a state may occur in which neither the first control unit ECU1 nor the second control unit ECU2 can activate the actuators 110. In the event of a short circuit of UB1 or UB2 to the jointly used actuator ground, an activation is no longer possible. A further possible error situation is the end of the actuation after UB1 or UB2. In this error situation, an ABS control, for example, is therefore neither possible by the first control unit ECU1 nor by the second control unit ECU2. Under some circumstances, complete redundancy of a primary braking system is therefore not provided.

Figure 2:
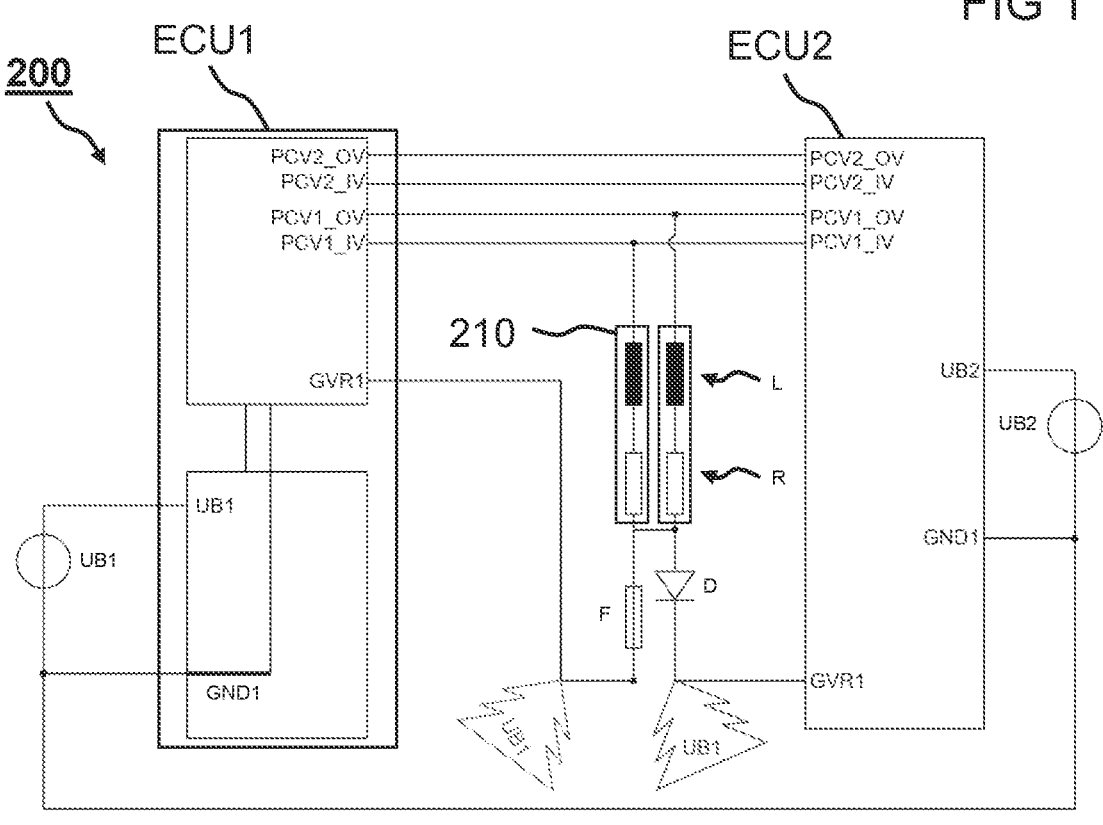
FIG. 2 shows a schematic illustration of a system.

FIG. 2 shows a schematic illustration of a system 200. The system 200 in FIG. 2 corresponds here to the system from FIG. 1 with the exception that only one pressure control valve having two actuators 210 is provided, with a fuse F and a diode D additionally being provided for protecting the pressure control valve. A plurality of electronic control units, here the first control unit ECU1 and the second control unit ECU2, for braking control use a common pressure control valve which has the two actuators 210 in order to produce redundancy in the system 200. In the event of a short circuit of UB1 at the actuator ground GVR1 of the first control unit ECU1, the fuse F is intended to trigger and thus to separate the ground line GVR1, which is short-circuited. The diode D is intended to provide protection for the ECU2 in the event of a short circuit of UB1 on the side of the second control unit. In both cases, the short circuit can also be triggered with UB2.

Figure 3:
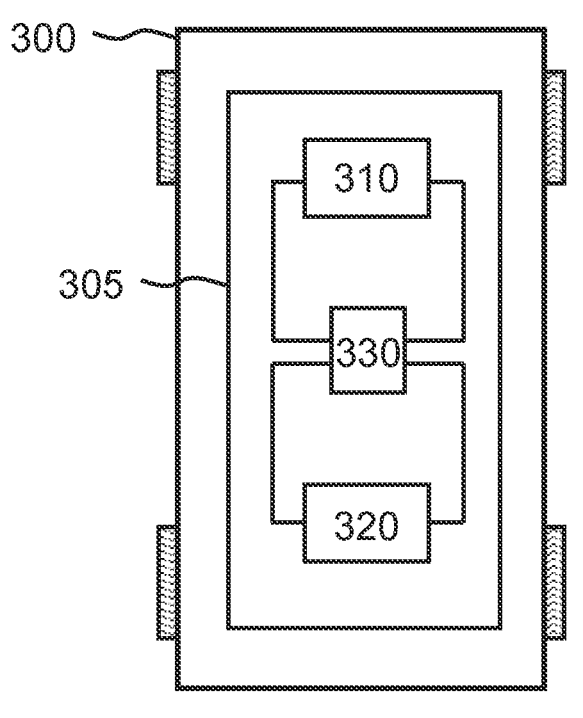
FIG. 3 shows a schematic illustration of a vehicle with a system according to an exemplary embodiment.

FIG. 3 shows a schematic illustration of a vehicle 300 having a system 305 according to an exemplary embodiment. The system 305 can resemble the system from FIG. 2. The system 305 comprises a first control unit 310, a second control unit 320 and a valve device 330. The control units 310 and 320 are electrically connected to the valve device 330. The valve device 330 will be discussed in more detail below.

Figure 4:
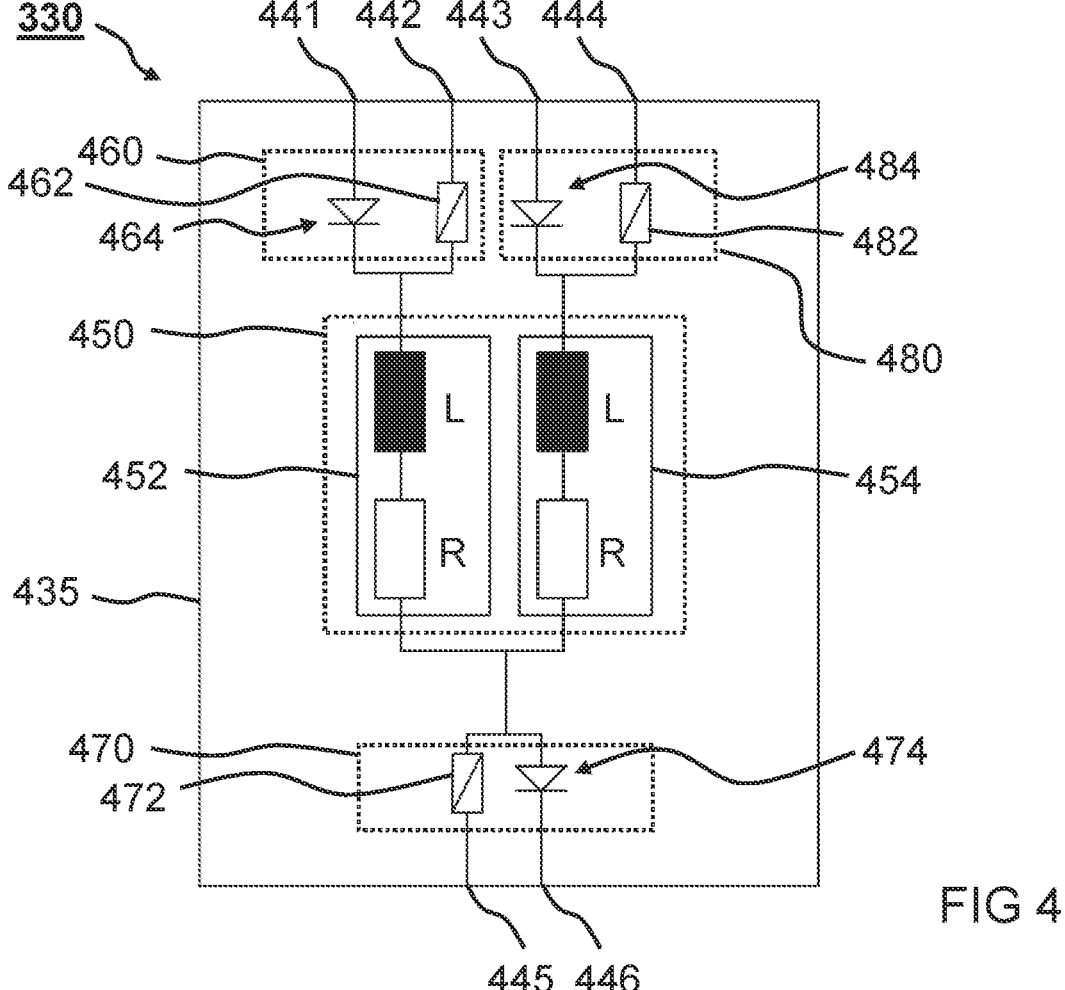
FIG. 4 shows a schematic illustration of an exemplary embodiment of a valve device for a system.

FIG. 4 shows a schematic illustration of an exemplary embodiment of a valve device 330 for a system. The system corresponds to or here resembles the system from FIG. 3. The system therefore comprises a first control unit and a second control unit that are electrically connectable or connected to the valve device 330. The valve device 330 corresponds to or resembles the valve device from FIG. 3. In particular, the valve device 330 is configured as a pressure control valve (PCV) for the system.

The valve device 330 comprises a valve unit 450, a first supply port 441, a second supply port 442, a first main port 445, a second main port 446, a first electric protective circuit 460, a second electric protective circuit 470 and a valve housing 435. The valve housing 435 is shaped to accommodate the valve unit 450 and the protective circuits 460 and 470.

The valve unit 450 is configured to set a pressure of a working medium for the system. The valve unit 450 comprises at least one actuator 452 for actuating the valve unit 450. The valve unit 450 is arranged within the valve housing 435. The at least one actuator 452 comprises a resistive inductance, as is shown in the illustration of FIG. 4 by an equivalent circuit diagram with an inductance L and a resistance R.

The first supply port 441 serves for the electrical connection of the actuator 452 to the first control unit of the system. The second supply port 442 serves for the electrical connection of the actuator 452 to the second control unit of the system. The first main port 445 serves for the electrical connection of the actuator 452 to the first control unit. The second main port 446 serves for the electrical connection of the actuator 452 to the second control unit.

The first protective circuit 460 and the second protective circuit 470 are arranged within the valve housing 435. The first protective circuit 460 is electrically connected between the first supply port 441 and the second supply port 442, on the one hand, and the actuator 452, on the other hand. The first protective circuit 460 comprises an electrical fuse device 462 and a diode element 464 that are integrated in series in the respective supply/ground connection. The second protective circuit 470 is electrically connected between the actuator 452, on the one hand, and the first main port 445 and the second main port 446, on the other hand. The second protective circuit 470 comprises an electrical fuse device 472 and a diode element 474 that are integrated in series in the respective supply/ground connection. In particular, the fuse devices 462 and 472 are configured to trigger in an electric error situation in the system, for example in the event of a short circuit, and to disconnect the erroneous supply/ground path. Furthermore, the diode elements 464 and 474 are configured to also prevent an impermissible current flow in such an error situation.

According to one exemplary embodiment, the diode element 464 of the first protective circuit 460 is connected between the first supply port 441 and the actuator 452. It is also the case here that the fuse device 462 of the first protective circuit 460 is connected between the second supply port 442 and the actuator 452. In addition, it is the case here that the fuse device 472 of the second protective circuit 470 is connected between the actuator 452 and the first main port 445. It is also the case here that the diode element 474 of the second protective circuit 470 is connected between the actuator 452 and the second main port 446. For example, in this case a forward direction of the diode element 464 of the first protective circuit 460 runs from the first supply port 441 to the actuator 452. Furthermore, for example, a forward direction of the diode element 474 of the second protective circuit 470 runs from the actuator 452 to the second main port 464.

In particular, the actuator 452 is attachable to a first electric supply potential of the first control unit via the first supply port 441 and to a second electric supply potential of the second control unit via the second supply port 442. Furthermore, the actuator 452 is attachable to a common electric ground potential of the control units via each of the ground ports 445 and 446.

According to a further exemplary embodiment, the valve unit 450 comprises at least one further actuator 454 for actuating the valve unit 450. According to this exemplary embodiment, the valve device 330 also comprises at least one third supply port 443 for electrically connecting the further actuator 454 to the first control unit, at least one fourth supply port 444 for electrically connecting the further actuator 454 to the second control unit, and at least one further electric protective circuit 480. The further protective circuit 480 likewise comprises an electrical fuse device 482 and a diode element 484, which are integrated in series in the respective supply/ground connection. The further protective circuit 480 is electrically connected between the third supply port 443 and the fourth supply port 444, on the one hand, and the further actuator 454, on the other hand. The second protective circuit 470 is also electrically connected between the further actuator, on the one hand, and the ground ports 445 and 446, on the other hand. More specifically, here in particular the diode element 484 of the further protective circuit 480 is connected between the third supply port 443 and the further actuator 454, with the fuse device 482 of the further protective circuit 480 being connected between the fourth supply port 444 and the further actuator 454. For example, in this case the further actuator 454 is attachable to the first electric supply potential via the third supply port 443 and to the second electric supply potential via the fourth supply port 444. Furthermore, the further actuator 454 is attachable to a common electric ground potential of the control units via each of the ground ports 445 and 446.

The pressure control valve or the valve device 330 comprises, for example, an inlet valve which has the actuator 452, and an outlet valve which has the further actuator 454, the actuators 452 and 454 being attachable or attached to a jointly used ground. Activation lines or supply lines are guided separately from the control units to the actuators 452 and 454.

According to one exemplary embodiment, the fuse devices 462, 472 and optionally 482 of the protective circuits 460, 470 and optionally 480 are arranged exchangeably in the protective circuits 460, 470 and optionally 480. Each of the fuse devices 462, 472 and optionally 482 can therefore be exchanged or renewed individually if this is required.

Exemplary embodiments and advantages thereof are summarized below with reference to the above-described figures and explained briefly using other words.

A remedy in respect of, for example, the error source mentioned with reference to FIG. 1 can therefore be provided by the protective circuits 460, 470 and optionally 480, which are advantageously integrated in the pressure control valve or the valve device 330, more precisely are arranged within the valve housing 435, in order to avoid further error sources. For example, the first control unit 310 (equivalent to the first control unit ECU1) can unrestrictedly transfer control of the valve device 330 to the second control unit 320 (equivalent to the second control unit ECU2). The first control unit 310 can unrestrictedly use the valve device 330 or the actuator 452 or actuators 452 and 454 thereof. The protective circuits 460, 470 and optionally 480 can therefore also be integrated in an activation path for the valve device 330.

THE LIST OF REFERENCE SIGNS IS AS FOLLOWS

100 System
110 Actuators
GND1 Common ground
GVR1 Main port
L Inductance
PCV1_IV Supply port
PCV1_OV Supply port
PCV2_IV Supply port
PCV2_OV Supply port
ECU1 First control unit
R Resistance
ECU2 Second control unit
UB1 First supply potential
UB2 Second supply potential
200 System
210 Actuators
D Diode
F Fuse
300 Vehicle
305 System
310 First control unit
320 Second control unit
330 Valve device
435 Valve housing
441 First supply port
442 Second supply port
443 Third supply port
444 Fourth supply port
445 First main port
446 Second main port
450 Valve unit
452 Actuator
454 Further actuator
460 First electric protective circuit
462 Electrical fuse device
464 Diode element
470 Second electric protective circuit
472 Electrical fuse device
474 Diode element
480 Further electric protective circuit
482 Electrical fuse device

484 Diode element
L Inductance
R Resistance

What is claimed is:

1. A valve device for a system for a vehicle, the system having a first control unit and a second control unit, the first and second control units being electrically connectable or connected to the valve device, comprising:

a valve unit for setting a pressure of a working medium for the system, wherein the valve unit has at least one actuator for actuating the valve unit;

a first supply port for the electrical connection of the actuator to the first control unit, a second supply port for the electrical connection of the actuator to the second control unit, a first main port for the electrical connection of the actuator to the first control unit and a second main port for the electrical connection of the actuator to the second control unit;

a first electric protective circuit and a second electric protective circuit, wherein the first protective circuit is electrically connected between: (i) the first supply port and the second supply port, and (ii) the actuator, wherein the second protective circuit is electrically connected between: (i) the actuator, and (ii) the first main port and the second main port, and wherein each of the first and the second protective circuits includes a respective electrical fuse device and a respective diode element that are integrated in series in at least the first and/or second supply port or at least the first and/or second main port; and a valve housing accommodating, inside the valve housing, the valve unit and the first and the second protective circuits including the respective electrical fuse devices and the respective diode elements.

2. The valve device of claim 1, wherein the actuator is attachable to a first electric supply potential of the first control unit via the first supply port, wherein the actuator is attachable to a second electric supply potential of the second control unit via the second supply port, wherein the actuator is attachable to a common electric ground potential of the control units via the first main port and the second main port and/or wherein the actuator is attachable to an electric supply potential of the first control unit via the first supply port, wherein the actuator is attachable to the electric supply potential of the second control unit via the second supply port, and wherein the actuator is attachable to a first electric ground potential of the control units via the first main port and to a second electric ground potential of the control units via the second main port.

3. The valve device of claim 1, wherein the first supply port and the second supply port are a supply voltage port and the first and second main port are a ground port, or wherein the first supply port and the second supply port are a ground port and the first and second main port are a supply voltage port.

4. The valve device of claim 1, wherein the respective diode element of the first protective circuit is electrically connected between the first supply port and the actuator, wherein the respective fuse device of the first protective circuit is electrically connected between the second supply port and the actuator, wherein the respective fuse device of the second protective circuit is electrically connected between the actuator and the first main port, and wherein the respective diode element of the second protective circuit is electrically connected between the actuator and the second main port.

5. The valve device of claim 1, wherein a forward direction of the respective diode element of the first protective circuit runs from the first supply port to the actuator, and wherein a forward direction of the respective diode element of the second protective circuit runs from the actuator to the second main port.

6. The valve device of claim 1, wherein the fuse devices of the first and second protective circuits are arranged exchangeably in the first and second protective circuits.

7. The valve device of claim 1, wherein the first control unit and the second control unit are external to the valve housing.

8. A valve device for a system for a vehicle, the system having a first control unit and a second control unit, the first and second control units being electrically connectable or connected to the valve device, comprising:

a valve unit for setting a pressure of a working medium for the system, wherein the valve unit has at least one actuator for actuating the valve unit;

a first supply port for the electrical connection of the actuator to the first control unit, a second supply port for the electrical connection of the actuator to the second control unit, a first main port for the electrical connection of the actuator to the first control unit and a second main port for the electrical connection of the actuator to the second control unit;

a first electric protective circuit and a second electric protective circuit, wherein the first protective circuit is electrically connected between the first supply port and the second supply port and the actuator, wherein the second protective circuit is electrically connected between the actuator, and the first main port and the second main port, and wherein each protective circuit has an electrical fuse device and a diode element that are integrated in series in at least the first and/or second supply port or at least the first and/or second main port; and a valve housing for accommodating the valve unit and the protective circuits;

wherein the valve unit has at least one further actuator for actuating the valve unit, wherein the valve device has at least one third supply port for the electrical connection of the further actuator to the first control unit, at least one fourth supply port for the electrical connection of the further actuator to the second control unit and at least one further protective circuit, wherein the further protective circuit is electrically connected between the third supply port and the fourth supply port, and the further actuator, and wherein the second protective circuit is electrically connected between the further actuator, and the first main port and the second main port.

9. The valve device of claim 8, wherein the diode element of the further protective circuit is connected between the third supply port and the further actuator, and wherein the fuse device of the further protective circuit is connected between the fourth supply port and the further actuator.

10. The valve device of claim 8, wherein the further actuator is attachable to the first electric supply potential via the third supply port, wherein the further actuator is attachable to the second electric supply potential via the fourth supply port.

11. The valve device of claim 8, wherein the first control unit and the second control unit are external to the valve housing.

12. A system for a vehicle, comprising:

a first control unit;

a second control unit; and a valve device, including:

a valve unit for setting a pressure of a working medium for the system, wherein the valve unit has at least one actuator for actuating the valve unit;

a first supply port for the electrical connection of the actuator to the first control unit, a second supply port for the electrical connection of the actuator to the second control unit, a first main port for the electrical connection of the actuator to the first control unit and a second main port for the electrical connection of the actuator to the second control unit;

a first electric protective circuit and a second electric protective circuit, wherein the first protective circuit is electrically connected between: (i) the first supply port and the second supply port, and (ii) the actuator, wherein the second protective circuit is electrically connected between: (i) the actuator, and (ii) the first main port and the second main port, wherein each of the first and the second protective circuits includes a respective electrical fuse device and a respective diode element that are integrated in series in at least the first and/or second supply port or at least the first and/or second main port; and a valve housing accommodating, inside the valve housing, the valve unit and the first and the second protective circuits including the respective electrical fuse devices and the respective diode elements;

wherein the first and the second control units are electrically connectable or connected to the valve device.

13. The system as claimed in claim 12, wherein the valve device has a first group of mechanically combined electric ports for attaching the first control unit and a second group of mechanically combined electric ports for attaching the second control unit.

14. The system of claim 12, wherein the first control unit and the second control unit are external to the valve housing.

\*   \*   \*   \*   \*